United States Patent [19]

Lesko

[11] Patent Number: 4,754,309
[45] Date of Patent: Jun. 28, 1988

[54] VACUUM FRAME

[75] Inventor: Robert J. Lesko, Newton, N.J.

[73] Assignee: Amergraph Corporation, Sparta, N.J.

[21] Appl. No.: 889,368

[22] Filed: Jul. 25, 1986

[51] Int. Cl.⁴ .............................................. G03B 27/20
[52] U.S. Cl. ......................................... 355/91; 355/87
[58] Field of Search .................................... 355/87, 91

[56] References Cited

U.S. PATENT DOCUMENTS

| | | |
|---|---|---|
| 2,956,769 | 10/1960 | Sigler et al. |
| 3,316,825 | 5/1967 | Carlson et al. ........................ 355/104 |
| 3,547,537 | 12/1970 | Betron ................................... 355/87 |
| 3,625,611 | 12/1971 | Orr et al. ............................... 355/91 |
| 3,635,559 | 1/1972 | Harrell et al. |
| 3,740,140 | 6/1973 | Wolf et al. |
| 3,995,955 | 12/1976 | Topfer |
| 4,089,603 | 5/1978 | Jacobs |
| 4,211,808 | 7/1980 | Trankle |
| 4,360,266 | 11/1982 | Takeuchi |
| 4,484,813 | 11/1984 | Maher et al. .......................... 355/94 |
| 4,504,142 | 3/1985 | Richards, Sr. |
| 4,551,016 | 11/1985 | Maher et al. .......................... 355/91 |

FOREIGN PATENT DOCUMENTS

| | | |
|---|---|---|
| 819623 | 9/1951 | Fed. Rep. of Germany ........ 355/91 |
| 2230111 | 6/1972 | Fed. Rep. of Germany |
| 1346306 | 2/1974 | United Kingdom .................. 355/91 |

*Primary Examiner*—Monroe H. Hayes

[57] ABSTRACT

A vacuum frame for exposing a light-sensitive sheet to a light pattern according to a negative includes a blanket frame having peripherally bonded thereto a platen and a blanket with the platen being bowable and the blanket being flexible. The platen and blanket are peripherally sealingly bonded to one another, forming a vacuum chamber therebetween. A light transmissive frame mounted to the blanket frame for movement toward and away from the blanket and a spacing and sealing means peripherally interposed between the blanket and the light transmissive frame when the light transmissive frame is moved toward the blanket define an exposure chamber with the blanket. The exposure chamber is adapted to receive a light sensitive sheet and negative.

A first vacuum inlet means connects the vacuum chamber to an evacuation means, and a second vacuum inlet means connects the exposure chamber to an evacuation means. A control means evacuates the vacuum chamber to hold the blanket to the platen and evacuates the exposure chamber while said blanket is held to said platen. When the vacuum in the exposure chamber reaches a high level, the platen bows, center-first, toward the light transmissive frame, forcing the blanket toward the light transmissive frame and forcing an interposed light sensitive sheet and negative into air-bubble-free contact with the light transmissive frame.

18 Claims, 3 Drawing Sheets

VACUUM FRAME

BACKGROUND OF THE INVENTION

Vacuum contact printing for the graphic arts has been known for a number of years. In this art, light-sensitive materials are placed in contact with a negative, such as a photographic negative, and exposed to light to provide a positive exposure on the light-sensitive material. One of the important aspects of this art is to be sure that the negative and the light-sensitive material are in intimate contact over their surfaces in order to assure a true image when the positive is exposed.

This is done by placing both the light-sensitive material and the negative in a chamber between a flexible blanket and a glass plate. The air between the blanket and glass plate is evacuated, so that atmospheric pressure on the other side of the blanket forces it against the plate, pressing the light-sensitive material and negative into intimate contact against the glass plate, through which light can be used to expose the light-sensitive material.

However, it has been found that at times air becomes trapped in the center of the space between the blanket and glass plate and cannot be evacuated, forming a bubble which causes distortions in the positive image being made on the light-sensitive material. Numerous proposals for overcoming this problem have been proposed, with varying degrees of success. Exemplary of vacuum printers, some of which attempt to overcome this problem are the disclosures of the following patents:

| Patentee | U.S. Pat. No. |
| --- | --- |
| Sigler et al. | 2,956,769 |
| Orr et al. | 3,625,611 |
| Harrell et al. | 3,635,559 |
| Wolf et al. | 3,740,140 |
| Topfer | 3,995,955 |
| Jacobs | 4,089,603 |
| Trankle | 4,211,808 |
| Takeuchi | 4,360,266 |
| Maher et al. | 4,484,813 |
| Richards, Sr. | 4,504,142 |
| Maher et al. | 4,551,016 |

Another device is shown in German Offenlegungsschrift - No. 2,230,111.

The foregoing devices all have various drawbacks, primarily including ineffectiveness and/or extra expense to implement.

The present invention fulfills the need in the art for an inexpensive and effective vacuum frame printer which eliminates the formation of such air bubbles.

SUMMARY OF THE INVENTION

The invention achieves this aim by providing a vacuum printer for exposing a light-sensitive sheet to a light pattern according to a negative including a blanket bed having peripherally bonded thereto a platen and a blanket. The platen is bowable and the blanket is flexible, with the platen and blanket being peripherally and sealingly bonded to one another, forming a vacuum chamber therebetween.

A light transmission frame is mounted to the blanket bed for movement toward and away from the blanket and a spacing and sealing means is peripherally interposed between the blanket and the light transmission frame, thereby forming an exposure chamber when the light transmission frame is moved toward the blanket. The exposure chamber is adapted to receive the light-sensitive sheet and negative. A first vacuum inlet means connects the vacuum chamber to an evacuation means and a second vacuum inlet means connects the exposure chamber to an evacuation means. Control means are provided for evacuating the vacuum chamber to hold the blanket to the platen and for evacuating the exposure chamber while the blanket is held to the platen. When the vacuum in the exposure chamber reaches a high level, the platen bows, center-first, toward the light transmission frame, forcing the blanket toward the light transmission frame, and forcing an interposed light-sensitive sheet and negative into air-bubble-free contact with the light transmission frame. This assures that no residual air can be trapped in the middle of the exposure chamber.

The light transmission frame may be made up of a peripheral support member and a sheet of glass mounted thereon. The light transmission frame may be pivotally mounted on a blanket frame and the blanket bed may be mounted on the blanket frame.

In one embodiment the control means begins evacuation of the vacuum chamber and the exposure chamber simultaneously, and a vacuum regulator in the first vacuum inlet means limits the level of vacuum attainable in the vacuum chamber to a level less than that attainable in the exposure chamber.

The invention may be used in making a rotary platemaker. If so, preferably a vacuum regulator is mounted on the blanket frame and the first and second vacuum inlet means split off as two legs of a tee mounted on the blanket frame and a third leg of the tee communicates with a vacuum source. This arrangement may also be used on non-rotary plate makers.

In one embodiment the control means first initiates evacuation of the vacuum chamber and subsequently initiates evacuation of the exposure chamber. It may do so by including in the control means, a timer for initiating evacuation of the exposure chamber a predetermined period of time after initiating of the exposure of the vacuum chamber. Alternatively, the control means may include means responsive to a reduced pressure in the vacuum chamber for initiating evacuation of the exposure chamber.

In order to achieve proper bowing of the platen, preferably the platen is made of aluminum, stainless steel, cold rolled steel or plastic. However, other materials may also be suitable. The blanket should be made of a material pliable enough to conform to any variations in thickness of the light-sensitive sheet, negative or registration materials therefor.

According to the present invention, there is also provided a process of exposing a light-sensitive sheet to a light pattern according to a negative including the steps of providing a vacuum printer having an exposure chamber with a light-transmissive wall and adapted to receive the lignt-sensitive sheet and the negative, a blanket chamber adjacent to the exposure chamber and having a flexible blanket as a common wall with the exposure chamber and placing a light-sensitive sheet on the blanket and the negative on the light-sensitive sheet. Further steps include closing the exposure chamber, evacuating the vacuum chamber to cause the blanket to be urged toward the vacuum chamber and simultaneously evacuating the exposure chamber to a level of vacuum exceeding the level of vacuum in the vacuum chamber, thereby causing the blanket to be urged into the exposure chamber and forcing the negative and light-sensitive sheet into air-bubble-free contact with the light-transmissive wall. Finally, the light-sensitive sheet is exposed to light through the light-transmissive wall and the negative.

The present invention also includes a process of placing a light-sensitive sheet on the blanket and the negative on the light-sensitive sheet, closing the exposure chamber and evacuating the vacuum chamber to cause the blanket to be urged toward the vacuum chamber. Subsequently, the exposure chamber is evacuated to a level of vacuum such that the blanket and platen are bowed into the exposure chamber, forcing the negative and the light-sensitive sheet into air-bubble-free contact with the light-transmissive wall. Then the light-sensitive sheet is exposed to light through the light-transmissive wall and the negative.

BRIEF DESCRIPTION OF THE DRAWINGS

The invention will be better understood by a review of the following detailed description in combination with a review of the drawings in which.

DETAILED DESCRIPTION OF THE PREFERRED EMBODIMENTS OF THE INVENTION

Figure 1:
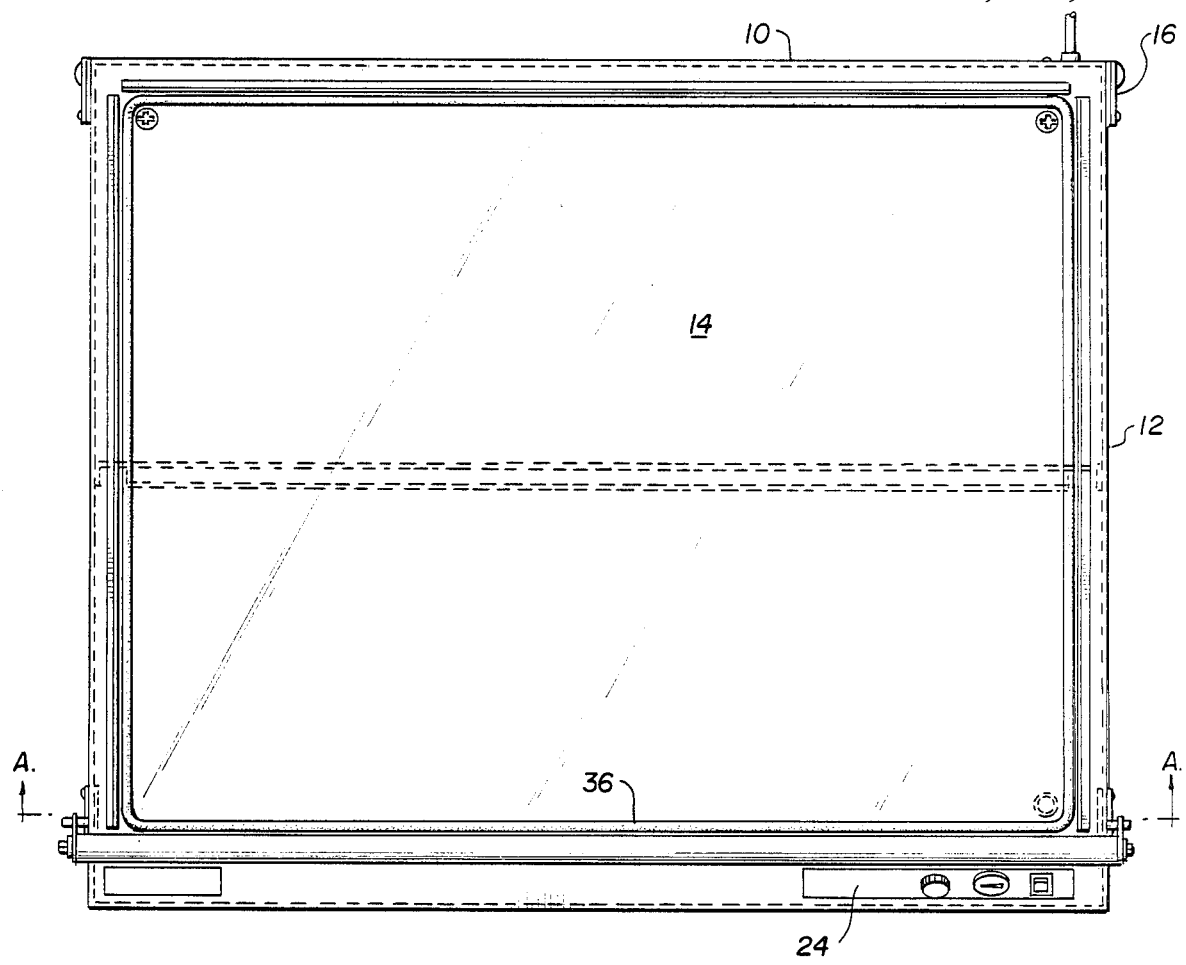
FIG. 1 is a plan view of a vacuum printer according to the invention.

Referring to FIG. 1, there is shown a plan view of a preferred emodiment of a vacuum frame 10 according to the invention. Frame 10 includes a base 12 and a light-transmissive glass frame 14 hinged as at 16 to base 12. A control panel 24 provides controls for light exposures and to vary the vacuum operations in accordance with the desired sequence as will be set forth more thoroughly hereinafter. Alternatively, preprogrammed devices may control the operations.

Figure 2:
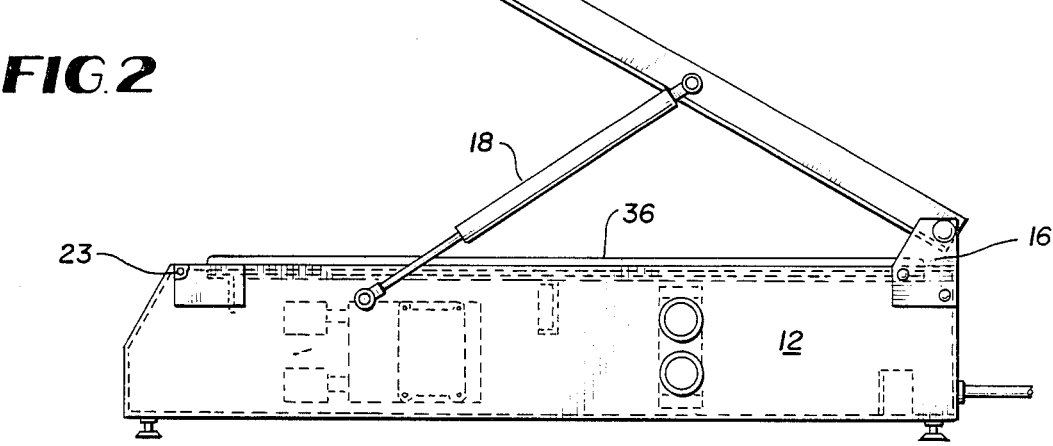
FIG. 2 is a side view of a vacuum printer in accordance with the invention, showing the light-transmission frame raised.

Referring to FIG. 2, the hinge 16 is more clearly seen, along with gas strut 18 which holds glass frame 14 in a desired elevated position to permit light-sensitive materials, negatives and the like to be placed on the blanket which is surrounded by sealing bead 36. A conventional locking arrangement 22 cooperates with pin 23 to hold glass frame in secure, juxtaposed relation to base 12 when the glass frame is closed onto the base 12.

Figure 3:
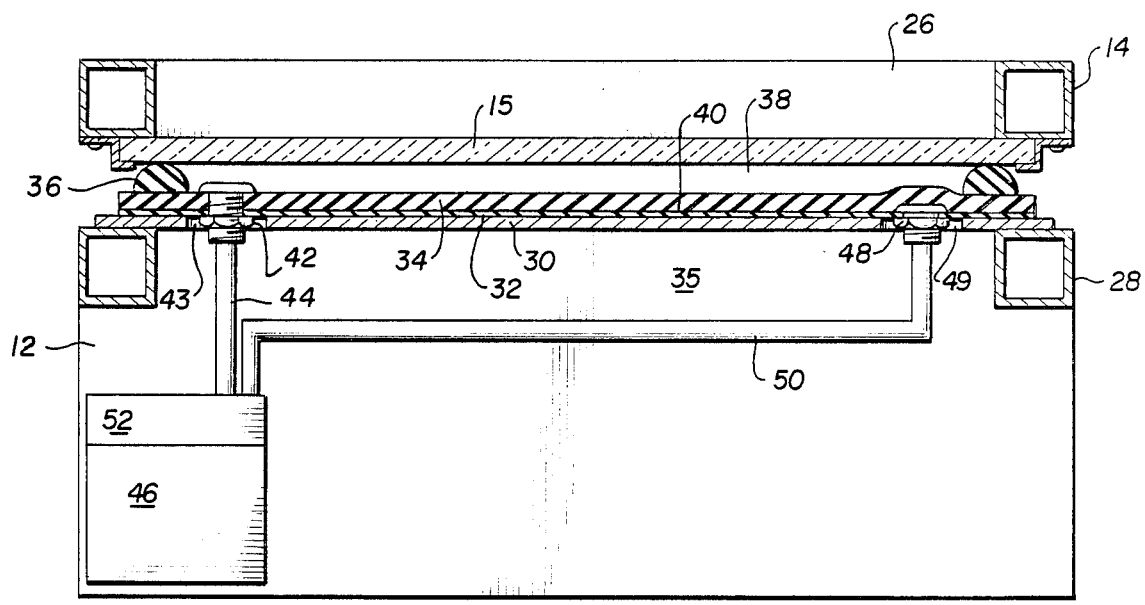
FIGS. 3-5 are partially schematic sectional views taken along the line A—A in FIG. 1, showing the arrangement of the platen and blanket in various stages of operation according to one embodiment of the invention.

Referring to FIG. 3, which is a sectional view along the lines A—A in FIG. 1, the structure of glass frame 14 can be seen in further detail. It includes a peripheral support 26, to which the locking arrangement 22, gas strut 18, and hinges 16 are affixed, but which are deleted from FIG. 3 for clarity.

Base 12 includes a blanket frame having peripheral sidewalls 28 and a blanket bed, also referred to herein as a platen support plate 30. Platen 32 and blanket 34 are peripherially mounted on the plate 30 and are sealed together around their periphery by a sealing means of conventional nature. Blanket 34 is formed of a flexible rubber or other material which will conform to the shape of the negative, light-sensitive material and registration means therefor and will be impervious to air. Conventional blanket materials are suitable. Platen 32 is formed of a relatively rigid material such as 0.050 gauge aluminum, stainless steel, cold rolled steel, or a plastic material. The primary requirement for the platen 32 is that it be more rigid than the blanket 34 while being capable of bowing adequately to flex upwardly under conditions which will be described more thoroughly hereinafter.

A peripheral sealing bead 36 of conventional nature on blanket 34 provides an air-tight seal between the blanket 34 and the glass sheet 15 of glass frame 14. This forms an exposure chamber 38 of suitable thickness to receive a light-sensitive material and a negative, with clearance for the glass frame to be closed onto the blanket. A vacuum chamber 40 is defined by the volume between blanket 34 and platen 32, albeit the volume will be small since the blanket and platen are in touching relation over most of their areas.

An inlet port 42 extends through hole 43 in plate 30 to establish communication between the exposure chamber 38 and vacuum line 44 and is sealed from the vacuum chamber 40 and the space 35 below the platen 32. Chamber 38 communicates via vacuum line 44 and control means 52 with a vacuum source 46 such as a vacuum pump. Another inlet port 48 extends through hole 49 in plate 30 and communicates with the vacuum chamber 40, but is sealed from the exposure chamber and the space 35 below platen 32. It communicates via vacuum line 50 and control means 52 with vacuum source 46. The control means 52 selectively opens valves in the lines 44 and 50 by any suitable means such as solenoid controlled valves. The control means operation will be seen more clearly hereinafter, and may be adjusted by connections between control means 52 and panel 24, as will be apparent to those of ordinary skill.

Figure 4:
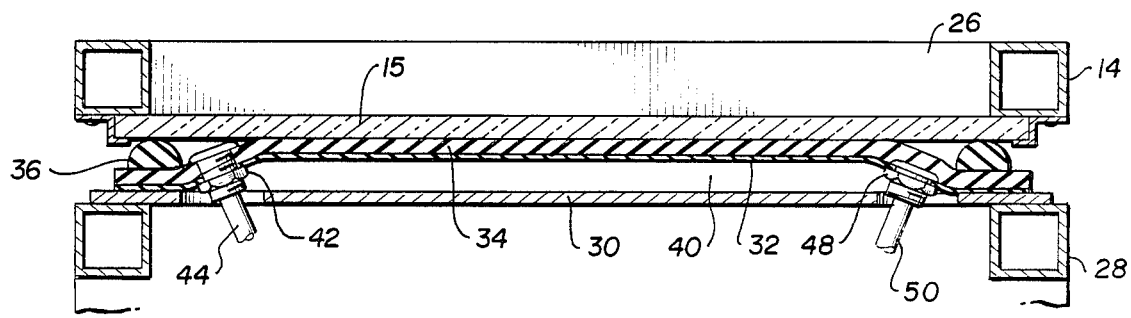

The apparatus is simple to operate: First, the glass frame is opened and the light-sensitive material (not shown) is placed on the blanket 34 and the negative (also not shown) is placed over top the light-sensitive material and the two are held in registration on the blanket by pins or other conventional means. Second, the glass frame is closed, with locking arrangement 22 holding glass frame 14 into sealing relation with peripheral sealing bead 36, thus defining air-tight exposure chamber 38. Third, vacuum is applied from vacuum source 46 through vacuum lines 44 and 50, simultaneously. Since the volume of vacuum chamber 40 is small, it is immediately evacuated and the blanket is held to the platen and adopts the rigidity of the platen. Meanwhile, the air in exposure chamber 38 is drawn down by vacuum source 46 to a very low level. Air is free to evacuate from all parts of chamber 38 since it is held open by the adhesion of the blanket to the platen. As a result, no air is trapped in the center of the exposure chamber when the blanket is allowed to flex upwardly into contact with glass sheet 15. As the vacuum in exposure chamber 38 becomes complete, the force on the platen caused by the pressure difference between the vacuum in the exposure chamber 38 and atmospheric pressure in space 35, forces the blanket and platen upward, center first, into contact with the glass sheet 15 as shown in FIG. 4. This assures that no residual air can be trapped in the middle of the exposure chamber when the blanket is allowed to conform to the contents of the exposure chamber. Note that in FIG. 4 the bowing of the platen appears somewhat exaggerated. The amount of distortion of the platen when bowing need not be great, on the order of ¼" over a 3' long platen.

Figure 5:
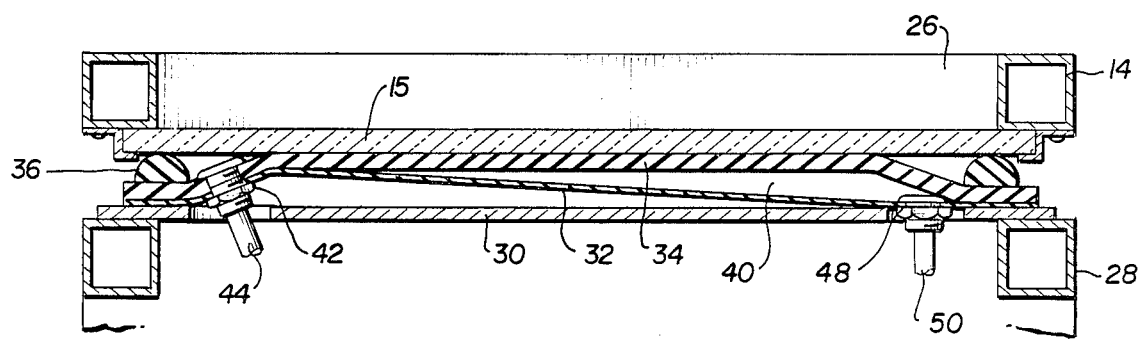

Fourth, when the platen has been distended as shown in FIG. 4, the control means 52 releases the vacuum in line 50 and allows atmospheric pressure to enter the vacuum chamber 40, thereby transferring the pressure differential to the blanket 34 alone and permitting it to conform intimately to the light sensitive material and negative to hold them tightly against the glass 15 for exposure. This is depicted in FIG. 5. Fifth, the light-sensitive material is exposed from a light source (not shown) through glass sheet 15. Sixth, the control means 52 releases the vacuum in line 44 and allows atmospheric pressure to reenter exposure chamber 38. Seventh, the locking arrangement 22 is released and the glass frame is opened so the exposed light-sensitive material and negative can be retrieved.

An alternative evacuation control arrangement includes a sensor to detect evacuation of the vacuum chamber to a particular level; when this is detected, evacuation of the exposure chamber begins.

Figure 6:
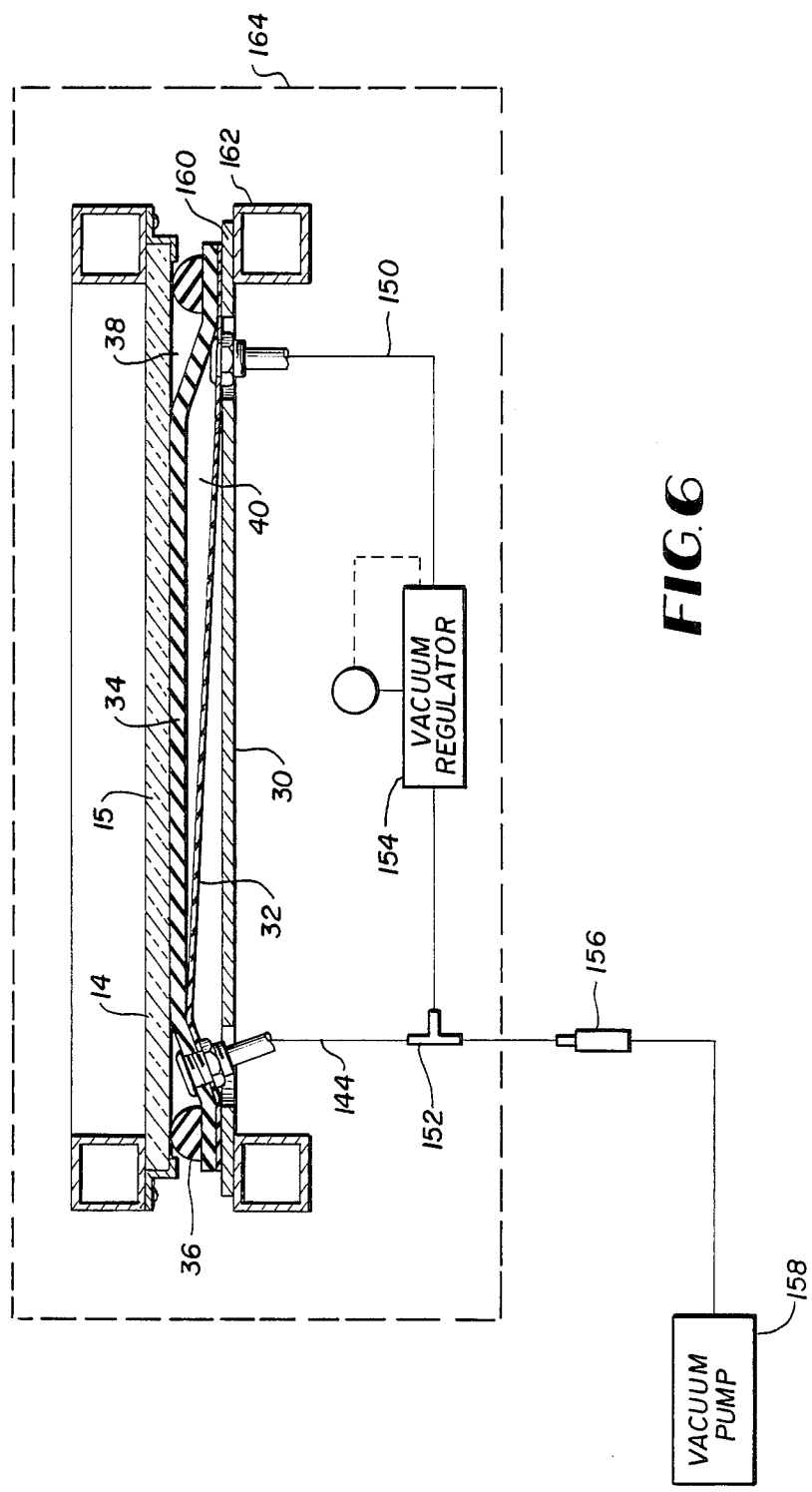
FIG. 6 is a similar sectional, and partially schematic view of an alternative embodiment of the invention.

Referring now to FIG. 6, there is shown an alternative embodiment of the invention, particularly well suited for use on rotary vacuum frames. Such rotary frames are known in the art, including various models of the Magnum line of plate makers manufactured and sold by Amergraph Corporation, Sparta, NJ. In a rotary frame the openable and closeable glass frame is loaded facing upward and rotated 180° to face a light source in the base of the unit for exposure. In FIG. 6 is shown an arrangement whereby the present invention may be used in such a rotary platemaker. Apparatus elements shown in FIG. 6 and similar to corresponding elements in FIGS. 3-5 are similarly numbered. Thus, glass sheet 15, sealing bead 36 and blanket 34 form an exposure chamber 38, while blanket 34 and platen 32 mounted on a blanket bed 160 define a vacuum chamber 40. The blanket bed is mounted on blanket frame 162. The exposure chamber 38 is connected by vacuum line 144 to one leg of a tee 152 while the vacuum chamber 40 is connected by a vacuum line 150 through vacuum regulator 154 to another leg of tee 152. The third leg of tee 152 extends through a rotary union 156 in the pivotal mounting of the rotary frame 164 to the base of the frame (not shown). From there it extends to a vacuum pump 158 which may be located in the base. The vacuum regulator 154 inhibits the level of vacuum which can be formed in the vacuum chamber 40 to a level less than a complete vacuum. Although not shown in FIG. 6, the tee 152 and regulator 154 may conveniently be mounted on blanket frame 162, which itself is a component of a rotary frame 164.

In operation, the vacuum drawn by pump 158 initially evacuates both the exposure chamber and vacuum chamber simultaneously. Again, due to the minimal volume of the vacuum chamber 40, the blanket 34 is immediately held fast to the platen 32 to hold the exposure chamber 38 open as it is evacuated. The vacuum in chamber 40 eventually reaches the level permitted by vacuum regulator 154, and is not further evacuated. When the vacuum in exposure chamber 38 is near total, it exceeds the preset vacuum level for vacuum chamber 40, so the blanket 34 experiences a differential pressure, forcing it toward the glass frame 14 and carrying the exposure materials into intimate contact with glass sheet 15. If desired, the vacuum in vacuum chamber 40 can be released at this point, as long as the vacuum in exposure chamber 38 is not released, thereby increasing the conformity of blanket 34 against the exposure materials and the glass frame 14. The frame can then be rotated and the exposure materials exposed to light to expose them. Since the vacuum regulator 154 and tee 152 are mounted on the blanket frame itself, only a single line passes through the pivot mechanism at the rotary union 156, eliminating any problems of twisting of vacuum lines.

While the invention has been described in what are now believed to be preferred embodiments, other modifications and refinements will become apparent to those of ordinary skill in the art and those are to be deemed as within the scope of this invention.

What is claimed is:

1. A vacuum frame for exposing a light-sensitive sheet to a light pattern according to a negative comprising a blanket frame having peripherally bonded thereto a platen and a blanket, said platen being semi-rigid and bowable, said blanket being flexible, and said platen and blanket being peripherally sealingly bonded to one another, forming a vacuum chamber therebetween, a light transmissive frame mounted to said blanket frame for movement toward and away from said blanket, a spacing and sealing means peripherally interposed between said blanket and said light transmissive frame when said light transmissive frame is moved toward said blanket, and thereby defining an exposure chamber, said exposure chamber being adapted to receive a light sensitive sheet and negative, a first vacuum inlet means connecting said vacuum chamber to an evacuation means, a second vacuum inlet means connecting said exposure chamber to an evacuation means, and control means for evacuating said vacuum chamber to hold said blanket to said platen and for evacuating said exposure chamber while said blanket is held to said platen, whereby when the vacuum in said exposure chamber reaches a high level, said platen bows, center-first toward said light transmissive frame, forcing said blanket toward said light transmissive frame and forcing an interposed light sensitive sheet and negative into air-bubble-free contact with said light transmissive frame outwardly from the center, squeegeeing out residual air in the exposure chamber.

2. A vacuum frame as claimed in claim 1 wherein said light transmissive frame comprises a peripheral support frame and a sheet of glass mounted thereon.

3. A vacuum frame as claimed in claim 2 wherein said blanket frame includes a blanket bed.

4. A vacuum frame as claimed in claim 3 wherein said light transmissive frame is pivotally mounted on said blanket frame.

5. A vacuum frame is claimed in claim 1 wherein said control means begins evacuation of said vacuum chamber and said exposure chamber simultaneously.

6. A vacuum frame is claimed in claim 5 wherein a vacuum regulator in said first vacuum inlet means limits the level of vacuum attainable in said vacuum chamber to a level less than that attainable in said exposure chamber.

7. A vacuum frame as claimed in claim 6 wherein said vacuum printer is a rotary vacuum frame.

8. A vacuum frame as claimed in claim 6 wherein said vacuum regulator is mounted on said blanket frame and said first and second vacuum inlet means split off as two legs of a tee mounted on said blanket frame, and the third leg of said tee communicates with said vacuum source.

9. A vacuum frame as claimed in claim 8 wherein said vacuum frame is a rotary vacuum frame.

10. A vacuum frame as claimed in claim 1 wherein said control means first initiates evacuation of said vacuum chamber and subsequently initiates evacuation of said exposure chamber.

11. A vacuum frame as claimed in claim 10 wherein said control means includes a timer for initiating evacuation of said exposure chamber after the initation of evacuation of said vacuum chamber.

12. A vacuum frame as claimed in claim 10 wherein said control means includes means responsive to a reduced pressure in said vacuum chamber for initiating evacuation of said exposure chamber.

13. A vacuum frame as claimed in claim 1 wherein said platen is made of a material selected from the group consisting of aluminum, stainless steel, cold rolled steel and plastic.

14. A vacuum frame as claimed in claim 1 wherein said blanket is made of a material pliable enough to conform to any variations in thickness of the light sensitive sheet, negative, or registration materials therefor.

15. A vacuum frame as claimed in claim 1 wherein said blanket and said platen are juxtaposed when the vacuum chamber is not evacuated.

16. A vacuum frame as claimed in claim 1 wherein said control means opens said vacuum chamber to atmosphere after said platen bows toward said light transmissive frame.

17. A vaccuum frame for exposing a light-sensitive sheet to a light pattern according to a negative comprising an exposure chamber defined by a light-transmitting sheet, a flexible blanket and a peripheral sealing bead, a vacuum chamber defined by said blanket and a bowable, semi-rigid platen, a first vacuum inlet communicating said exposure chamber to a vacuum inlet source, a second vacuum inlet communicating said vacuum chamber to said vacuum source, and a vacuum regulator operatively associated with said second vacuum inlet to limit the level of vacuum attainable in said vacuum chamber so that as vacuum is simultaneously drawn in both said chambers, the blanket is initially held to the platen to permit near total evacuation of the exposure chamber and when the vacuum in the exposure chamber reaches a high level, said platen bows, center-first, toward said light transmitting sheet, forcing said blanket and an interposed light sensitive sheet and negative toward said light transmitting sheet outwardly from the center, squeegeeing out residual air in the exposure chamber.

18. A vacuum frame as claimed in claim 17 wherein said platen is bowable toward said light-transmitting sheet and said vacuum regulator opens paid vacuum chamber to atmosphere after said plaaten bows toward said light-transmitting sheet.

* * * * *